(12) United States Patent
Santori et al.

(10) Patent No.: US 9,176,279 B2
(45) Date of Patent: Nov. 3, 2015

(54) ANALYZING LIGHT BY MODE INTERFERENCE

(75) Inventors: Charles M. Santori, Palo Alto, CA (US); Di Liang, Santa Barbara, CA (US); Marco Fiorentino, Mountain View, CA (US); David A. Fattal, Mountian View, CA (US); Zhen Peng, Foster City, CA (US); Raymond G. Beausoleil, Redmond, WA (US); Andrei Faraon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/373,417

(22) PCT Filed: Apr. 25, 2012

(86) PCT No.: PCT/US2012/034865
§ 371 (c)(1),
(2), (4) Date: Jul. 21, 2014

(87) PCT Pub. No.: WO2013/162528
PCT Pub. Date: Oct. 31, 2013

(65) Prior Publication Data
US 2014/0362374 A1    Dec. 11, 2014

(51) Int. Cl.
*G02B 6/00* (2006.01)
*G02B 6/26* (2006.01)
(Continued)

(52) U.S. Cl.
CPC ............ *G02B 6/2813* (2013.01); *G01J 3/1895* (2013.01); *G01J 3/0227* (2013.01); *G01J 3/0259* (2013.01);
(Continued)

(58) Field of Classification Search
CPC ............... G02B 6/2813; G02B 6/14; G02B 2006/12152; G02B 2006/12147; G02B 6/02047; G01N 2021/7779; G01N 2021/458; G01N 21/45; G02F 2001/217; G01J 3/4412; G01J 3/2823; G01J 3/1895
USPC ................ 385/12, 14, 28, 30, 36, 38, 48, 37; 356/303, 326, 450, 451, 305
See application file for complete search history.

(56) References Cited

U.S. PATENT DOCUMENTS

| 3,560,724 A | 2/1971 | Condell, Jr. |
| 4,324,492 A * | 4/1982 | Drenckhan et al. ........... 356/481 |

(Continued)

FOREIGN PATENT DOCUMENTS

| CN | 101842691 A | 9/2010 |
| CN | 102192785 A | 9/2011 |

(Continued)

OTHER PUBLICATIONS

"Phase retrieval for undersampled broadband images" by Fienup, Journal of Opticla Society of America A, vol. 16, No. 7, pp. 1831-1837, 1999.*

(Continued)

*Primary Examiner* — Robert Tavlykaev
(74) *Attorney, Agent, or Firm* — Brooks, Cameron & Huebsch, PLLC

(57) ABSTRACT

Apparatuses and systems for analyzing light by mode interference are provided. An example of an apparatus for analyzing light by mode interference includes a number of waveguides to support in a multimode region two modes of the light of a particular polarization and a plurality of scattering objects offset from a center of at least one of the number of waveguides.

15 Claims, 9 Drawing Sheets

(51) Int. Cl.

| | | |
|---|---|---|
| G02B 6/42 | (2006.01) | |
| G02B 6/34 | (2006.01) | |
| G01J 3/40 | (2006.01) | |
| G01J 3/28 | (2006.01) | |
| G01J 3/45 | (2006.01) | |
| G02B 6/28 | (2006.01) | |
| G01J 3/18 | (2006.01) | |
| G02F 1/21 | (2006.01) | |
| G02B 6/12 | (2006.01) | |
| G01J 3/02 | (2006.01) | |
| G01J 3/44 | (2006.01) | |

(52) U.S. Cl.
CPC .............. *G01J 3/2823* (2013.01); *G01J 3/4412* (2013.01); *G01J 3/45* (2013.01); *G02B 2006/12152* (2013.01); *G02F 2001/217* (2013.01)

(56) References Cited

U.S. PATENT DOCUMENTS

| | | | |
|---|---|---|---|
| 5,479,260 A | 12/1995 | Fattinger | |
| 5,537,367 A * | 7/1996 | Lockwood et al. | 367/87 |
| 7,361,501 B2 | 4/2008 | Koo et al. | |
| 2006/0119853 A1 | 6/2006 | Baumberg et al. | |
| 2006/0164637 A1 | 7/2006 | Wang | |
| 2009/0316159 A1* | 12/2009 | Scott | 356/454 |
| 2010/0021179 A1* | 1/2010 | Kikuchi | 398/183 |
| 2010/0110443 A1 | 5/2010 | Cheben et al. | |
| 2010/0271634 A1* | 10/2010 | Dominguez Horna et al. | 356/477 |
| 2011/0050845 A1 | 3/2011 | Muhammed | |

FOREIGN PATENT DOCUMENTS

| | | |
|---|---|---|
| EP | 0760938 B1 | 11/1999 |
| WO | WO-2011040923 A1 | 4/2011 |

OTHER PUBLICATIONS

Cheben, P. et al., Recent Advances in Fourier-transform Waveguide Spectrometers, (Research Paper), 13th International Conference on Transparent Optical Networks (ICTON), Jun. 26-30, 2011, pp. 1-4.

PCT International Search Report & Written Opinion, Jan. 2, 2013, PCT Patent Application No. PCT/US2012/034865, 9 pages.

* cited by examiner

ANALYZING LIGHT BY MODE INTERFERENCE

BACKGROUND

Transmission of light through waveguides has been used for many types of applications. Light signals offer potential advantages over electronic signals. Light can be input from a variety of sources.

Optical spectroscopy, for instance, is useful in a variety of fields, such as physics, astronomy, chemistry, biology, and medicine, among others. Raman spectroscopy, for instance, can use a laser to produce light that interacts with a sample to produce frequency-shifted light, thereby providing an optical fingerprint of the sample's molecular structure. Using such a system, for instance, requires an ability to collect and identify the optical fingerprint.

DETAILED DESCRIPTION

Examples of the present disclosure include apparatuses and systems for analyzing light by mode interference. An example of an apparatus for analyzing light by mode interference, as described herein, includes a number of waveguides to support in a multimode region two modes of the light of a particular polarization and a plurality of scattering objects offset from a center of at least one of the number of waveguides.

Apparatuses and systems that include analyzing light by mode interference, as described herein, have applicability in many fields in which spectroscopy is utilized, such as in physics, astronomy, chemistry, biology, and medicine, among others. An example is Raman spectroscopy (e.g., surface-enhanced Raman spectroscopy (SERS)), in which a laser interacts with a sample to produce frequency-shifted scattered light, thereby providing a molecular fingerprint of the sample's molecular structure. A compact, low-cost spectrometer that can be used in the field would be beneficial for Raman spectroscopy. However, a spectrometer having a resolution below 100 gigahertz (GHz) often involves a large grating-based monochromator. The apparatuses and systems described herein are designed to reduce the size and/or weight of spectrometers (e.g., compared to the large grating-based monochromators), while also providing high throughput and resolution. Another application described herein is hyperspectral imaging using an apparatus (e.g., a chip-scale apparatus) that allows for spectroscopic imaging in many different frequency (e.g., wavelength) bands in parallel.

Figure 1:
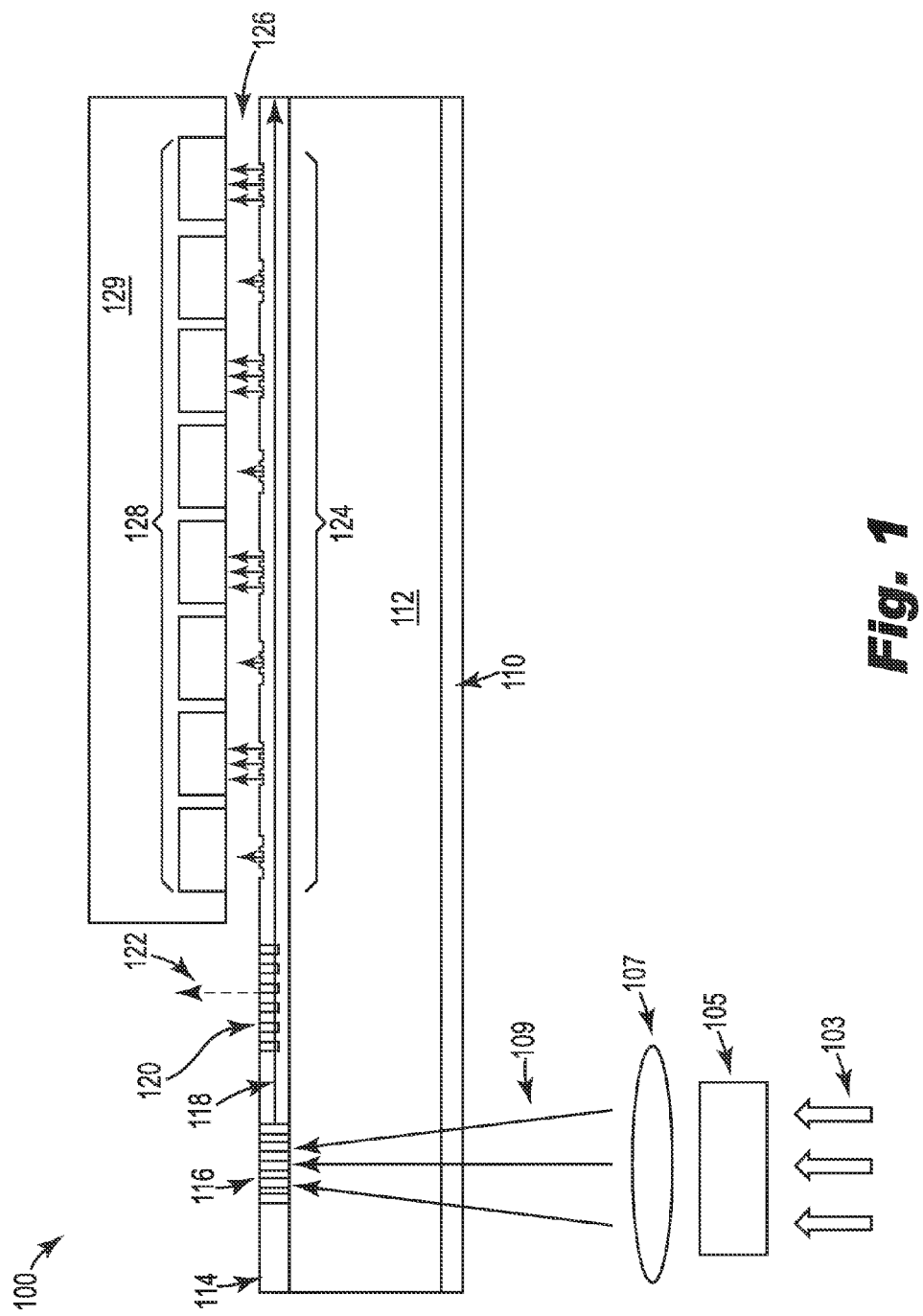
FIG. 1 illustrates an example of a waveguide coupled to scattering objects in association with a measurement device according to the present disclosure.

FIG. 1 illustrates an example of a waveguide coupled to scattering objects in association with a measurement device according to the present disclosure. In the following Detailed Description and Figures, some features are grouped together in a single example (e.g., embodiment) for the purpose of streamlining the disclosure. This manner of presentation is not to be interpreted as reflecting an intention that the disclosed embodiments require more features (e.g., elements and/or limitations) than are expressly recited in the claims of the present disclosure. Rather, as the following claims reflect, inventive subject matter may require less than all features of a single disclosed example. Hence, the following claims are hereby incorporated into the Detailed Description, with each claim standing on its own merit as a separate embodiment.

Apparatuses and systems that include analyzing light by mode interference as described in the present disclosure can include using a number of waveguides coupled to a plurality of scattering objects offset from a center of each of the number of waveguides. As described herein, in various examples, scattering objects that can be configured to scatter substantially the same or different frequencies or ranges of frequencies of light can serve as drop filters to transmit these specific frequencies (e.g., as light, energy, and/or signals) to detectors (e.g., to a measurement device designed to collect such light, energy, and/or signals).

As illustrated in FIG. 1, the example of the waveguide coupled to scattering objects in association with the measurement device 100 includes input light 103, which can include a range of frequencies and/or wavelengths originating from a variety of sources, directed toward a waveguide 114 coupled to scattering objects 124. As previously indicated, the example shown in FIG. 1 includes optional features. A coarse frequency sorting element 105 can, in some examples, be included for separation of input light into a plurality of different input ranges of optical frequencies (e.g., using a prism, an arrayed wavelength grating (AWG), an echelle grating, among others) and/or a focusing lens 107 can be included to accurately direct and/or concentrate (e.g., using a micro-lens) the resultant input light 109 for the waveguide 114 coupled to the scattering objects 124. The resultant input light 109 (e.g., which may, in some examples, be the same as the original input light 103) can, for example, be collected by an input coupler 116 connected to (e.g., integrated with) the waveguide 114. The features shown in FIG. 1 are illustrated from a side view perspective, whereas the features in other figures may be illustrated from a top view perspective.

In the detailed description of the present disclosure, reference is made to the accompanying drawings that form a part hereof and in which is shown by way of illustration how examples of the disclosure may be practiced. These examples are described in sufficient detail to enable those of ordinary skill in the art to practice the examples of this disclosure and it is to be understood that other examples may be utilized and that process, electrical, and/or structural changes may be made without departing from the scope of the present disclosure. Further, where appropriate, as used herein, "for example" and "by way of example" should be understood as abbreviations for "by way of example and not by way of limitation".

The figures herein follow a numbering convention in which the first digit or digits correspond to the drawing figure number and the remaining digits identify an element or component in the drawing. Similar elements or components between different figures may be identified by the use of similar digits. For example, 111 may reference element "11" in FIG. 1, and a similar element may be referenced as 211 in FIG. 2. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

The waveguide 114 illustrated in FIG. 1 can be formed from various materials. For example, a first waveguide, as described herein, can be formed using a first material, and a second waveguide can be formed using a second material that is different from the first material. The different materials can be selected and/or configured to retain and/or transmit, for example, different frequencies or ranges of frequencies of light. Examples of such materials include silicon nitride, silicon carbide, and/or gallium phosphide, among others (e.g., on silicon oxide), which allow transmission of light through visible and near infrared frequencies.

In some examples, a waveguide can be supported by a substrate 112 (e.g., formed from a substantially transparent material). In various examples, the substrate 112 can include a number of layers having refractive and/or reflective indices that differ from those of the waveguide 114. In some examples, the substrate 112 can be interfaced with (e.g., on an opposite surface from a surface supporting the waveguide 114) a number of layers of dielectric material 110 (e.g., a dielectric stack) serving as a filter for the input light 103, 109. In some examples, the dielectric material can be positioned between the waveguide 114 and the substrate 112. As such, the opposite surface from the surface supporting the waveguide 114 can, in some examples, be interfaced with an anti-reflective coating (not shown).

The input coupler 116 integrated with the waveguide 114 illustrated in FIG. 1, in various examples, can be or can include a grating coupler. Such a grating coupler can have a grating with a predetermined pitch, etch angle, and/or duty cycle for diffraction and/or reflection of incident light 109, for example, such that the incident light 109 becomes light 118 that travels in an intended direction along the waveguide 114.

In some examples, the waveguide 114 can be integrated with a grating filter 120. Such a grating filter 120 may be configured (e.g., with a predetermined pitch, etch angle, and/or duty cycle) for diffraction and/or back-reflection of a particular frequency or range of frequencies 122 of the light 118 traveling along the waveguide 114. For example, the particular frequency or range of frequencies 122 may correspond to output from a laser (e.g., utilized in SERS), the output frequencies of which are not of interest in downstream analysis. As such, the particular frequency or range of frequencies 122 can, in some examples, be diffracted and/or scattered out of the waveguide 114 (e.g., before the light 118 traveling in the intended direction along the waveguide 114 reaches a first scattering object).

The light 118 traveling along the waveguide 114 can interact with a plurality of scattering objects 124. The plurality of scattering objects 124 are illustrated in FIG. 1 from a side view perspective indicating that the plurality of scattering objects 124 are vertically offset (e.g., above and/or below the waveguide relative to a substrate, a dielectric layer, and/or another waveguide) from and substantially parallel to a center axis (e.g., a centrally positioned longitudinal axis) of the waveguide 114. However, as shown in other figures illustrated from a top view perspective (e.g., FIG. 4), the plurality of scattering objects 124 can be laterally (e.g., horizontally) offset from a waveguide and substantially parallel to a center axis of the waveguide (e.g., some or all of the plurality of scattering objects 124 can be in front of and/or behind the waveguide 114 shown in FIG. 1).

As described herein, waveguides can be configured to transmit either one or two modes of light of a given polarization. For example, physical characteristics of a waveguide (e.g., height and/or width dimensions, and/or materials from which the waveguide is formed, among other characteristics) can be selected to enable input and/or transmission of the one or two modes of light (e.g., with different group and/or phase velocities). One waveguide transmitting two modes of light or two adjacent waveguides each transmitting one mode of light, for example, can produce interference between the two modes of light wherever the modes overlap (e.g., based on the different group and/or phase velocities between the two modes). The interference produces a spatial beating pattern that varies relative to a particular position in the waveguide. A period (e.g., inversely related to a spatial frequency) of the spatial beating pattern changes dependent on a particular temporal frequency of the light because of the different group velocities between the two modes.

Signals 126 (e.g., light and/or energy) corresponding to an intensity and/or the period of the spatial beating pattern can be output by the plurality of scattering objects 124, for example, spaced at regular intervals (e.g., a spatial frequency) along the waveguide 114. In various examples, the scattering objects can be configured as weak scattering objects (e.g., by using a short grating, particular material, and/or a shallow groove, among other possibilities) that each scatters a small fraction of the spatial beating pattern passing a position of the scattering object (e.g., less than 1% of the light and/or energy thereof). As such, a large majority of the optical intensity can pass beyond the position of each scattering object so as to pass the position of a next scattering object in a sequence of scattering objects.

The scattering objects can, in various examples, be formed (e.g., formed from metal, plastic, ceramic materials, among others) as a grating (e.g., with a predetermined pitch, etch angle, and/or duty cycle), a point object and/or a protrusion (e.g., including metallic particles, such as nanoparticles, and/or metallic wires, such as nanowires) of a selected size extending into and/or outside of the waveguide), a perforation of a selected size through a wall of the waveguide, and/or a groove in (e.g., etched into) an inside and/or outside wall of the waveguide, among other scattering object configurations. The temporal frequencies at which a particular scattering object will scatter can depend on a number of other factors related to the physical structure of the particular scattering object. For example, factors such as diameter, circumference, and/or thickness of the scattering object, a proportion of the diameter contributing to a hole in the middle of the scattering object, and/or a particular material from which the scattering object is formed, among other factors, can be selected to determine the frequencies at which the particular scattering object will scatter light. In some examples, the frequencies at which a particular scattering object will scatter can be determined experimentally and a number of these factors can be subsequently adjusted to achieve a selected scatter range of frequencies.

If a spatial frequency of interference of the two modes is larger than a spatial frequency of the scattering objects, then the signal detected and/or output by the scattering objects is aliased to a lower spatial frequency. The aliased signal can, for example, be usable when the input light (e.g., 103, 109) is within a known spectral bandwidth (e.g., as determined with the coarse frequency sorting element 105, and/or the dielectric material 110 serving as a filter for the input light 103, 109).

Consequently, each of the scattering objects in the plurality of scattering objects 124 can be configured (e.g., selected), as described herein, to scatter a signal intensity (e.g., light and/or energy) 126 corresponding to an intensity of the particular spatial beating pattern present in the light 118 traveling along the waveguide 114 at the particular position of each scattering object. For example, each of the scattering objects in the plurality of scattering objects 124 can be configured to scatter substantially the same temporal frequency or range of temporal frequencies.

Such emitted light, energy, and/or signals 126 can, in various examples, be collected by detectors 128, which can be included in a measurement device 129, designed to collect such light, energy, and/or signals. The individual detectors 128 (e.g., photoactive sensors) of the measurement device 129 (e.g., a charge coupled device (CCD)) can, in various examples, be co-aligned with each of the plurality of scattering objects 124 (e.g., have substantially the same spatial frequency as the scattering objects).

Figure 2:
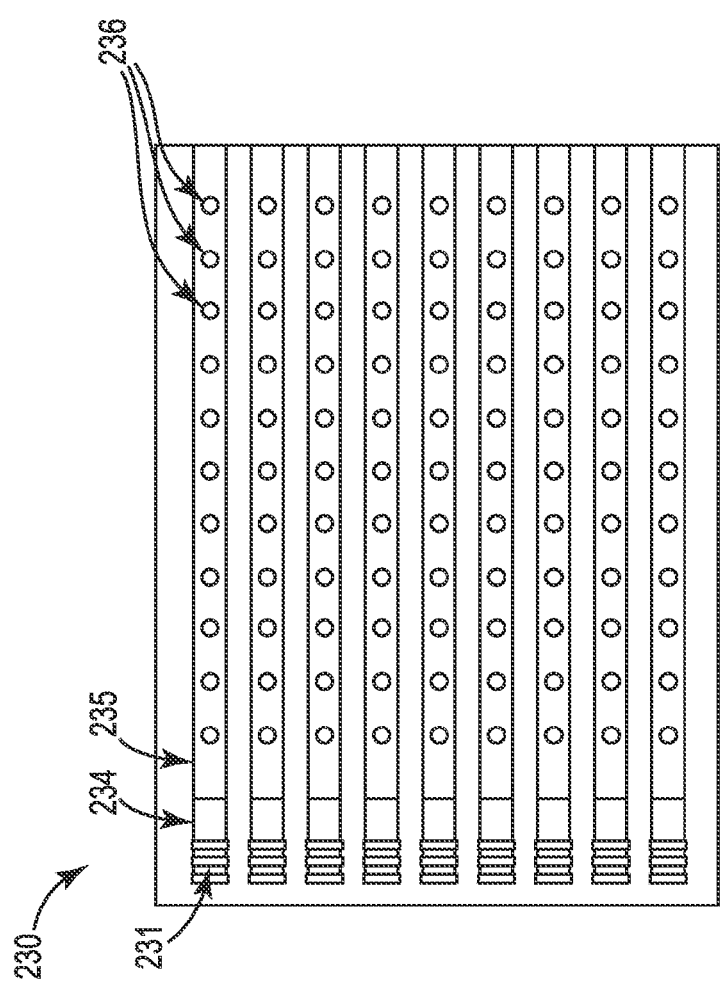
FIG. 2 illustrates an example of an array of multimode waveguides coupled to scattering objects according to the present disclosure.

FIG. 2 illustrates an example of an array of multimode waveguides coupled to scattering objects according to the present disclosure. As illustrated in FIG. 2, the array of multimode waveguides 230 is shown from a top view perspective. The array of multimode waveguides 230 includes a plurality of waveguides (e.g., multimode waveguide 235). By way of example, the plurality of multimode waveguides 230 shown in FIG. 2 is nine, however, the present disclosure is not limited to nine waveguides in an array of multimode waveguides. That is, an array of multimode waveguides includes any number of waveguides that is two or more such that the number of waveguides is unlimited (e.g., the number of waveguides can be more than a hundred in some examples).

In some examples, the multimode waveguide including scattering objects 230 can be coupled to (e.g., integrated with) a single-mode input waveguide 234 (e.g., positioned at or near an end of the multimode waveguide 235) to collect and/or transmit input light. As described herein, the multimode waveguide 235 can, in various examples, be configured to support conversion (e.g., input and/or transmission) of the single mode of input light to two modes of the light, for example, with different group and/or phase velocities (e.g., by selected variation of height and/or width dimensions, and/or materials from which the multimode waveguide is formed, among other characteristics).

For example, an input waveguide (e.g., single-mode input waveguide 234) can, in various examples, transmit (e.g., support through selected variations in height and/or width dimensions, and/or materials from which the input waveguide is formed, among other characteristics) a single mode of light from the single source. However, when light from the single-mode input waveguide enters a multimode waveguide (e.g., multimode waveguide 235), the single mode of light can be projected onto a particular coherent superposition of two modes supported by the multimode waveguide. A selected configuration of a junction between a single-mode input waveguide and the multimode waveguide can enable two different modes in the multimode waveguide to be excited with comparable amplitudes, which can enhance contrast in a fringe pattern produced by interference of the two modes.

As described herein, a single-mode structure (e.g., a waveguide) can support a single mode for a particular polarization of interest (e.g., either a transverse electric or a transverse magnetic). Further, as described herein, a multimode structure (e.g., one or two waveguides) can support two modes for a particular polarization of interest (e.g., either the transverse electric or the transverse magnetic).

In some examples, a number of the single-mode input waveguides (e.g., single-mode input waveguide 234) can be integrated with an input coupler (e.g., input coupler 231 positioned at or near an end of the single-mode input waveguide 234). For example, a number of the input couplers can be grating couplers positioned at (e.g., integrated with) the end of each single-mode input waveguide for collection (e.g., capture) of light to be analyzed. Such grating couplers can have a grating with a predetermined pitch, etch angle, and/or duty cycle for diffraction and/or reflection of incident light such that the incident light becomes light that travels in an intended direction along each of the waveguides. The grating couplers (e.g., input coupler 231) illustrated in FIG. 2 are shown as symbolic representations thereof and are not intended as limiting examples of particular input coupler configurations.

By way of example, the number of input couplers shown in FIG. 2 is nine, however, the present disclosure is not limited to nine input couplers in an array of waveguides. That is, if the array of waveguides has, for example, any grating couplers, the number of grating couplers can be any number from one to the number of input waveguides such that some input waveguides can have input couplers other than grating couplers, some input waveguides can share a grating coupler with a number of other input waveguides, or each input waveguide can be integrated with a grating coupler, among other examples. In some examples, a single-mode and/or a multimode waveguide can have a wider transition region to integrate with the input coupler to provide a funnel for photons into a narrower pathway compared to an area of an incident light beam on the input coupler.

Each of the plurality of multimode waveguides (e.g., multimode waveguide 235) in the array 230 can, in various examples, have a plurality of scattering objects (e.g., scattering objects 236) associated therewith. That is, for example, the plurality of scattering objects 236 can be offset from a center and substantially parallel to a center axis of multimode waveguide 236. By way of example, the plurality of scattering objects associated with each multimode waveguide shown in FIG. 2 is eleven, however, the present disclosure is not limited to eleven scattering objects associated with each multimode waveguide. That is, the plurality of scattering objects associated with each waveguide includes any number of scattering objects that is two or more such that the number of scattering objects is unlimited (e.g., the number of scattering objects can be more than a hundred in some examples).

Backscattering of the emitted light, energy, and/or signals can be reduced, for example, by diffraction and/or reflection by an output grating serving as a scattering object such that the of light, energy, and/or signals travel in an intended direction away from the scattering object (e.g., scattering objects 124 in FIG. 1), for example, toward the individual detectors 128 (e.g., photoactive sensors) of the measurement device 129 (e.g., a CCD) shown in FIG. 1.

Accordingly, each combination of an input coupler, a single-mode input waveguide, a multimode waveguide, and/or a plurality of scattering objects (e.g., input coupler 231, single-mode input waveguide 234, multimode waveguide 235, and/or plurality of scattering objects 236) can be configured to collect (e.g., capture) and/or transmit a particular selected range of temporal frequencies. In addition, each of such combinations can be configured to emit a particular selected range of temporal frequencies of light, energy, and/or signals corresponding to the intensity of the particular spatial beating pattern present in the interference of the modes along the waveguide at the particular position of each scattering object. As such, each of the plurality of such combinations can be configured to collect and/or transmit a different selected range of temporal frequencies and/or emit a different selected range of temporal frequencies of light, energy, and/or signals.

Hence, the array of waveguides 230, as illustrated in FIG. 2, can be configured to analyze, for example, a large range of frequencies in an input light sample. The large range of frequencies can be analyzed because each combination of an input coupler, a single-mode input waveguide, a multimode waveguide, and/or a plurality of scattering objects can be configured to collect and/or transmit a particular selected range of temporal frequencies and/or emit a particular selected range of temporal frequencies of light, energy, and/or signals that are different from those selected ranges of frequencies to which such combinations associated with other waveguides in an array are configured to collect and/or transmit and/or emit.

As just described, a "hyperspectral imager" can be constructed. A two-dimensional array can, for example, have 100 input couplers (e.g., grating couplers) to collect (e.g., from an AWG) different ranges of frequencies of the input light into, for example, 100 waveguides. Such an arrangement can operate as a hyperspectral imager of a broad band of frequencies through a band range of frequencies. The breadth of the frequency band can be determined, for example, by whether the input couplers (e.g., grating couplers) are configured to collect (e.g., capture) a broad or a narrow band of frequencies, what modes the waveguides are configured to retain and/or transmit, among other considerations.

As an alternative, each combination of an input coupler, a single-mode input waveguide, a multimode waveguide, and/or a plurality of scattering objects can be configured to collect and/or transmit and/or emit substantially the same selected range of temporal frequencies, (e.g., each such combination is configured redundantly). An array of waveguides 230 (e.g., with input couplers such as 231 positioned adjacently across a width) that has each combination of an input coupler, a single-mode input waveguide, a multimode waveguide, and/or a plurality of scattering objects configured substantially the same can, for example, provide redundancy in output of ranges of temporal frequencies of light, energy, and/or signals. Such redundancy can be used to compensate for random variation in, for example, light, energy, and/or signals sensed and/or emitted by the plurality of scattering objects (e.g., by calibration, post-processing, etc.) in analysis and/or construction of a spectrum for the input light.

The array of waveguides 230 with an array of light inputs (e.g., input couplers such as 231) positioned adjacently across a width (e.g., orthogonal to a direction of input light) can functionally have a broad "entrance slit" comparable to that of a large, conventional (e.g., free-space) spectrometer. As such, an increased "throughput" of input light can be enabled. The increased throughput of input light can be useful when the light originates from a spatially extended source. A spatially extended source can, for example, be a source of light with a diameter larger than a diffraction-limited spatial resolution of the collection optics, which can be approximated by the wavelength of light divided by twice the numerical value of the collection optics.

In some examples, input light can be focused into the input couplers (e.g., grating couplers) to provide a collimated input of different light bands (e.g., via a prism and/or a grating, among other techniques). A bandwidth focused into each of the input couplers can be smaller than a free spectral range (FSR) provided by the light, energy, and/or signals emitted from the scattering objects 235, for example. The FSR can, in some examples, be a frequency interval at which a measured interference pattern (e.g., including an aliasing effect contributed to by the scattering objects) is repeated.

In some examples, each of the multimode waveguides 235 shown in FIG. 2 can be a multimode waveguide that can, in various examples, be configured for input and/or transmission of two modes of the light, for example, with different group and/or phase velocities (e.g., by variation of height and/or width dimensions, and/or materials from which the waveguide is formed, among other characteristics). Interference between the two different velocities (e.g., spatial frequencies) of light can produce beating patterns with distinguishable spatial frequencies. As described herein, the beating patterns can be aliased to a lower spatial frequency by the scattering objects 236 spaced at regular intervals (e.g., a spatial frequency). As such, energy, light, and/or signals aliased to the lower spatial frequency can be emitted by the scattering objects 235.

The energy, light, and/or signals aliased to the lower spatial frequency and emitted by the scattering objects 236 can, in various examples, be collected (e.g., captured) by, for example, individual detectors, such as the individual detectors 128 (e.g., photoactive sensors) of the measurement device 129 (e.g., a CCD) shown in FIG. 1. Such aliased signals can, as described herein, be analyzed and/or calibrated by processing resources (e.g., using Fourier analysis) to determine particular characteristics (e.g., a spectrum) that identify, for example, a particular source for the input light (e.g., via Raman spectroscopy).

Resolution achievable by individual straight waveguides (e.g., multimode waveguide 235) that include scattering objects (e.g., scattering objects 236), as described herein, can be approximated by $\Delta v=(c/L)/(n_{g1}-n_{g2})$, where $\Delta v$ is the resolution, c is the speed of light, L is a length of the waveguide, and $(n_{g1}-n_{g2})$ is a difference between the group indices of the two modes of light. For example, a resolution of 50 gigahertz (GHz) is attainable with an L value of 1 centimeter and a group index mismatch of 0.6. Higher resolution can be achieved using "serpentine" waveguides.

Hence, an example of a system for analyzing light by mode interference, as described herein, can include a plurality of scattering objects (e.g., 124, 236) offset from and substantially parallel to a center axis of each of a number of waveguides (e.g., 114, 235), where the number of waveguides is formed to support (e.g., via physical characteristics of an input coupler 116, 234, an input waveguide 234, 342, and/or a waveguide 114, 232, 344, 454, 455, 564, 774) two modes of the light (e.g., emitted from a single source (e.g., 103)). Interference between the two modes of the light can, in various examples, be aliased to a lower frequency by emission of signals (e.g., 126) collected by the plurality of scattering objects (e.g., 124, 236). The system can, in some examples, include a charge coupled device (e.g., 129) with sensors (e.g., 128) co-aligned with the plurality of scattering objects (e.g., 124, 236) to directly collect the signals (e.g., 126) emitted by the plurality of scattering objects (e.g., 124, 236).

In some examples, the system can include a plurality of substantially parallel waveguides (e.g., 235) that form a two dimensional array (e.g., 230). In some examples, the system can include a coarse frequency sorting element (e.g., 105) for separation of input light (e.g., 103) into a plurality of different output ranges of optical frequencies. For example, a particular output range of optical frequencies from an AWG can be selected for input into each of the input couplers 231 positioned at or near an end of each waveguide (e.g., single-mode waveguide 234 and/or multimode waveguide 235) shown in FIG. 2. As an alternative, different output ranges of optical frequencies from an AWG can be selected for input into each of the input couplers 231 positioned at or near an end of each waveguide shown in FIG. 2.

Figure 3A:
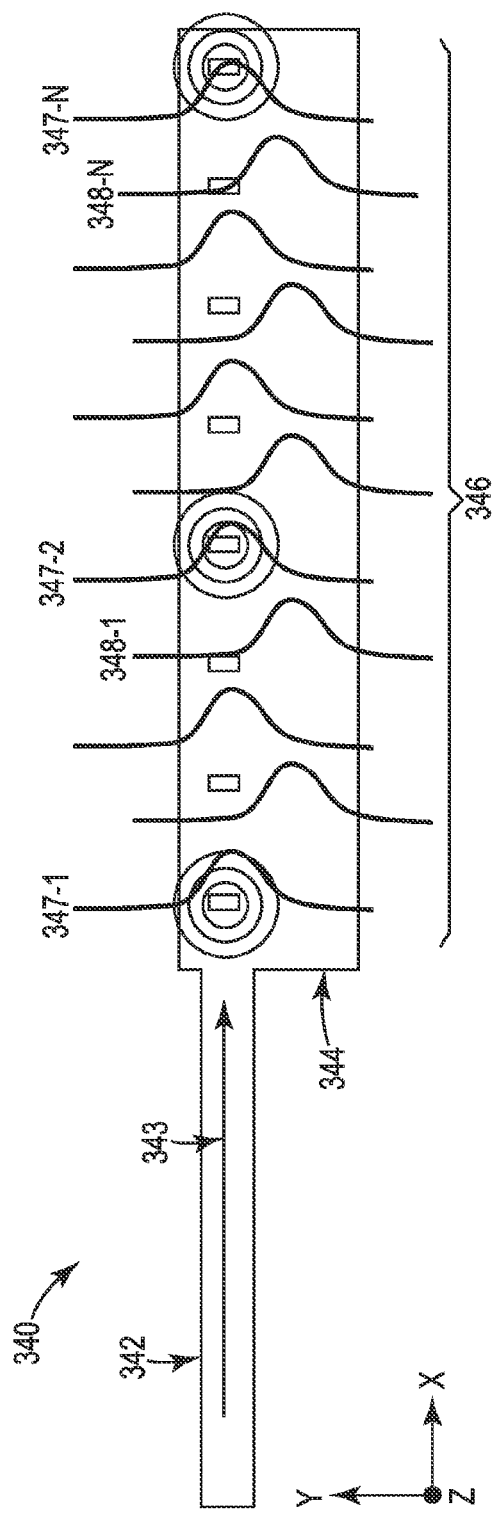
FIGS. 3A-3B illustrate two examples of multimode waveguides including scattering objects according to the present disclosure.
Figure 3B:
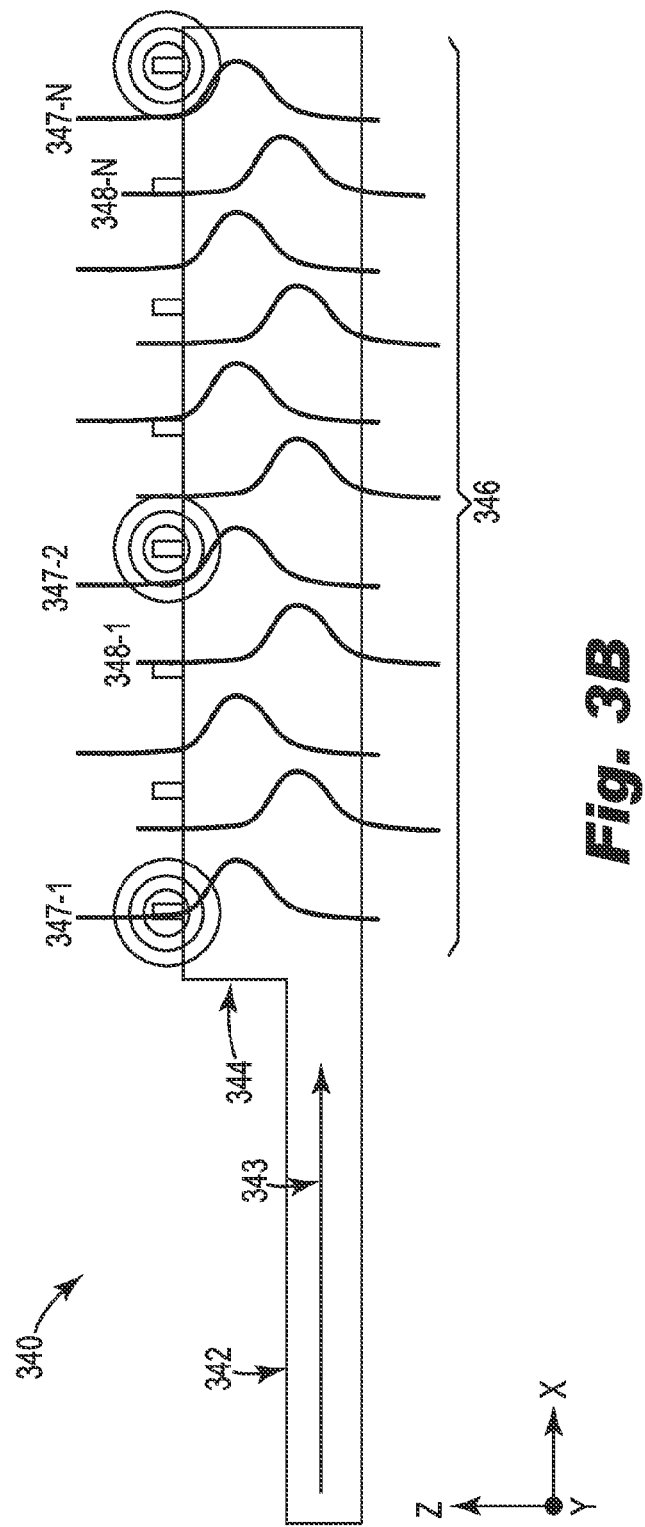

FIGS. 3A-3B illustrate two examples of multimode waveguides including scattering objects according to the present disclosure. As illustrated in FIG. 3A, a first example of the multimode waveguide including scattering objects 340 is shown from a top view perspective. By way of example, a plurality of scattering objects 346 in the multimode waveguide 344 shown in FIG. 3A is eight, however, the present disclosure is not limited to eight scattering objects in a multimode waveguide. That is, a multimode waveguide can include any number of scattering objects that is two or more such that the number of scattering objects is unlimited (e.g., the number of scattering objects can be more than a hundred in some examples).

In some examples, the multimode waveguide including scattering objects 340 can be coupled to (e.g., integrated with) a single-mode input waveguide 342 (e.g., positioned at or near an end of the multimode waveguide 344) to collect and/or transmit a single mode of input light 343. The multimode waveguide 344 can, in various examples, be configured to support conversion (e.g., input and/or transmission) of the single mode of input light to two modes of the light, for example, with different group and/or phase velocities (e.g., by selected variation of height and/or width dimensions, and/or materials from which the multimode waveguide is formed, among other characteristics).

FIG. 3A illustrates that the multimode waveguide 344 can, in various examples, be wider than the input waveguide 342. In some examples, the increased width can be connected to enabling support (e.g., the conversion and/or transmission) of the two modes of the light with different group and/or phase velocities.

The single-mode input waveguide 342 and/or the multimode waveguide 344 can, in some examples, be formed (e.g., formed as a layer) from a higher refractive-index material on (e.g., a layer of) a lower refractive-index material (not shown). As such, the multimode waveguide 344 can be wider in a y direction (substantially vertically in the plane of FIG. 3A) than the multimode waveguide 344 is thick in a z direction (substantially perpendicular to the plane of FIG. 3A) such that a fringe pattern resulting from interference between the two modes is oriented substantially in the y direction.

In some examples, the multimode waveguide 344 can have the plurality of scattering objects 346 offset substantially horizontally (e.g., in the y direction) from a center axis (e.g., substantially in an x direction in the plane of FIG. 3A that is substantially perpendicular to the y direction) of the multimode waveguide 334). The offset can, in various examples, be selected to enhance the contrast with which a multimode interference pattern is transferred to detectors of a measurement device. The contrast can, for example, be enhanced when electric field amplitudes corresponding to the two excited waveguide modes are comparable at locations of the scattering objects. Having comparable amplitudes also can help to make loss of the two modes in the waveguide comparable, which can contribute to interference contrast along a length of the waveguide. In some examples, the plurality of scattering objects 346 can be configured to extend through the thickness (e.g., in the z direction) of the multimode waveguide.

The multimode waveguide 344 can, in various examples, be configured (e.g., by selected variation of height and/or width dimensions, and/or materials from which the waveguide is formed, among other characteristics) for transmission of the two modes of the light. In some examples, a first mode can have a transverse electric field intensity profile with an apex near a center of the waveguide, and which will not have nodes (e.g., where an electric field amplitude crosses through zero) in the transverse plane. A second mode can have a transverse electric field intensity profile with a single node near the center of the waveguide and two intensity apices that are laterally offset in positive and negative directions. When these two modes are excited with comparable amplitudes, intensity profiles of the superimposed fields can oscillate laterally due to multimode spatial interference.

The scattering objects 346 (e.g., weak scattering objects, as described herein) can, in various examples, be spaced at regular intervals (e.g., a spatial frequency) along the multimode waveguide 344. As such, each of the scattering objects 346 can scatter a small fraction of a spatial beating pattern passing a position of the scattering object. A magnitude of the light, energy, and/or signals scattered by each of the scattering objects 346 can vary dependent upon a fringe pattern produced by interference of the two modes. That is, the magnitude of the light, energy, and/or signals scattered by a particular scattering object can depend upon whether the scattering object is associated with (e.g., intersected by) an apex or a nadir, or therebetween, of the fringe pattern (e.g., the spatial beating pattern) produced by interference of the two modes.

For example, the scattering objects associated with an apex of the fringe pattern (e.g., 347-1, 347-2, 347-N) can scatter (e.g., emit) an elevated magnitude of light, energy, and/or signals relative to the scattering objects not associated with the apex of the fringe pattern (e.g., 348-1, 348-N). Whether a detectable magnitude of light, energy, and/or signals is scattered by a particular scattering object can, for example, depend on how close to an apex of the fringe pattern the scattering object is and/or a sensitivity of the scattering object, among other considerations.

If monochromatic light is sent into the waveguide, the fringe pattern can oscillate according to a simple sinusoidal pattern, multiplied by a decaying exponential envelope due to loss from the scattering objects as well as other waveguide losses (e.g., material absorption and/or scattering from sidewall roughness, among other contributions). If multiple frequencies of light are input into the waveguide, the fringe pattern may exhibit more complex oscillation patterns and/or may appear damped, but in either case a spectrum of input light can be obtained from Fourier analysis of the fringe pattern, provided that the bandwidth of input light if less than a FSR of the waveguide device.

As illustrated in FIG. 3B, a second example of a multimode waveguide including scattering objects 340 is shown from a side view perspective such that the orientation axes are rotated clockwise substantially 90 degrees. By way of example, the plurality of scattering objects 346 in the multimode waveguide 344 shown in FIG. 3B is also eight, however, the present disclosure is not limited to eight scattering objects in a multimode waveguide. That is, a multimode waveguide can include any number of scattering objects that is two or more such that the number of scattering objects is unlimited (e.g., the number of scattering objects can be more than a hundred in some examples). In some examples, the input waveguide 342 and/or the multimode waveguide 344 can be supported by a substrate (not shown), in various examples, formed from a substantially transparent material and/or including a number of layers having refractive and/or reflective indices that differ from those of the input waveguide 342 and/or the multimode waveguide 344.

The multimode waveguide 344 can, in various examples, be configured to support conversion (e.g., input and/or transmission) of the single mode of input light to two modes of the light, for example, with different group and/or phase velocities (e.g., by selected variation of height and/or width dimensions, and/or materials from which the multimode waveguide is formed, among other characteristics).

FIG. 3B illustrates that the multimode waveguide 344 can, in various examples, be taller than the input waveguide 342. In some examples, the increased height can be connected to enabling support (e.g., the conversion and/or transmission) of the two modes of the light with different group and/or phase velocities.

The multimode waveguide 344 can be taller in a z direction (substantially vertically in the plane of FIG. 3B) than the multimode waveguide 344 is thick in a y direction (substantially perpendicular to the plane of FIG. 3B) such that a fringe pattern resulting from interference between the two modes is oriented substantially in the z direction. In some examples, the multimode waveguide 344 can have the plurality of scattering objects 346 offset substantially vertically (e.g., in the z direction) from a center axis (e.g., substantially in an x direction in the plane of FIG. 3B that is substantially perpendicular to the z direction) of the multimode waveguide). The offset can, in various examples, be selected to enhance the contrast with which a multimode interference pattern is transferred to detectors of a measurement device. The contrast can, for example, be enhanced when electric field amplitudes corresponding to the two excited waveguide modes are comparable at locations of the scattering objects. Having comparable amplitudes can also help to make loss of the two modes in the waveguide comparable, which can contribute to interference contrast along a length of the waveguide.

In some examples, the multimode waveguide 344 can have the plurality of scattering objects 346 attached to and/or embedded in a top surface of the multimode waveguide 344. In some examples, the plurality of scattering objects 346 can be configured to extend through and/or across the thickness (e.g., in the y direction) of the multimode waveguide. In various examples, multiple connected input waveguides and/or multimode waveguides, as just described, can be adjacently positioned along their length (e.g., with barrier layers positioned between the multiple connected input waveguides and/or multimode waveguides).

The multimode waveguide 344 can, in various examples, be configured (e.g., by selected variation of height and/or width dimensions, and/or materials from which the waveguide is formed, among other characteristics) for transmission of the two modes of the light. In some examples, a first mode can have a transverse electric field intensity profile with an apex near a center of the waveguide, and which will not have nodes (e.g., where an electric field amplitude crosses through zero) in the transverse plane. A second mode can have a transverse electric field intensity profile with a single node near the center of the waveguide and two intensity apices that are laterally offset in positive and negative directions. When these two modes are excited with comparable amplitudes, intensity profiles of the superimposed fields can oscillate vertically due to multimode spatial interference.

The plurality of scattering objects 346 can, in various examples, be offset vertically from the center of the multimode waveguide 344 (e.g., to enable scattering from each of the two modes with substantially the same amplitude). As described herein, a high spatial beating frequency (e.g., resulting from a large group and/or phase velocity mismatch) can be aliased to a lower spatial frequency by the scattering objects (e.g., as represented by the light, energy, and/or signals shown at 347-1, 347-2, 347-N).

The high spatial beating frequency (e.g., resulting from the large group and/or phase velocity mismatch) can, for example, be too rapid to effectively resolve by individual detectors (e.g., photoactive sensors) of a measurement device (e.g., a CCD), for example, as shown in FIG. 1. However, the spatial frequency of the light, energy, and/or signals aliased by the scattering objects can be lowered to a range that is resolvable by detectors of a measurement device.

To enable effective detection and/or resolution of the light, energy, and/or signals scattered (e.g., emitted) by the scattering objects (e.g., scattering objects 346 shown in FIGS. 3A and 3B), the scattering objects can, in various examples, be co-aligned with the detectors of the measurement device. For example, each of the individual detectors 128 (e.g., photoactive sensors) of the measurement device 129 (e.g., a CCD) shown in FIG. 1 is shown as being co-aligned with one of the plurality of scattering objects 124.

Figure 4:
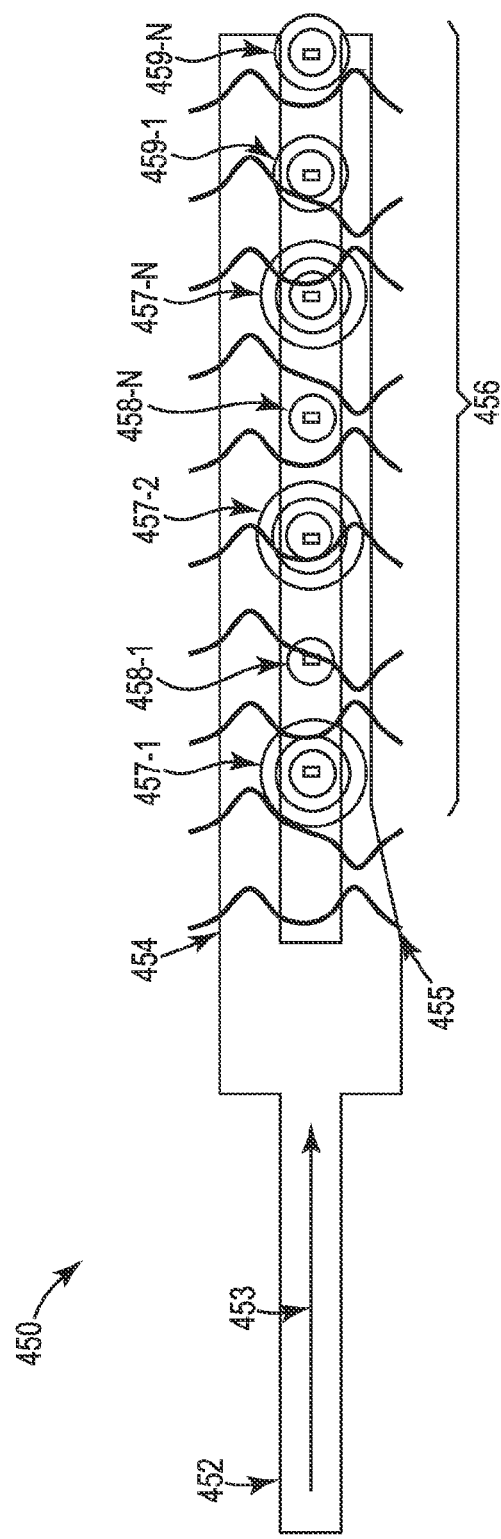
FIG. 4 illustrates an example of evanescently coupling two single-mode waveguides with scattering objects positioned therebetween according to the present disclosure.

FIG. 4 illustrates an example of evanescently coupling two single-mode waveguides with scattering objects positioned therebetween according to the present disclosure. As illustrated in FIG. 4, the two single-mode waveguides with scattering objects positioned therebetween 450 are shown from a top view perspective. By way of example, a plurality of scattering objects 456 positioned between a first single-mode waveguide 454 and a second single-mode waveguide 455 shown in FIG. 4 is seven, however, the present disclosure is not limited to seven scattering objects between two waveguides. That is, a plurality of scattering objects between two single-mode waveguides can include any number of scattering objects that is two or more such that the number of scattering objects between the two single-mode waveguides is unlimited (e.g., the number of scattering objects between the two single-mode waveguides can be more than a hundred in some examples).

In some examples, the two single-mode waveguides with scattering objects positioned therebetween 450 can be coupled to (e.g., integrated with) a single-mode input waveguide 452 (e.g., positioned at or near an end of the first single-mode waveguide 454 and/or at or near an end of the second single-mode waveguide 455) to collect and/or transmit input light 453. Waveguides 452, 454 and 455 can, in some examples, each be designed to support a single transverse mode (e.g., each waveguide may support a single transverse electric polarized mode and/or a single transverse magnetic polarized mode) over the frequency range of interest. The single-mode input waveguide 452 can, in some examples, include a wider region to enable access of the input light 453 to the first single-mode waveguide 454 and/or the second single-mode waveguide 455. A length of this wider region may be chosen to increase coupling efficiency to single-mode waveguides 454 and 455, which can result from multi-mode interference in this short region (e.g., the wider region can be a multi-mode interference coupler). Alternatively and/or in addition, a Y-junction may be utilized to split light input from single-mode input waveguide 452 to single-mode waveguides 454 and 455.

The first single-mode waveguide 454 and the second single-mode waveguide 455 can, in various examples, be configured such that each of their modes of the light have different group and/or phase velocities (e.g., by variation of height and/or width dimensions, among other characteristics). That is, the first single-mode waveguide 454 can be configured for transmission of a first mode of the two modes and the second single-mode waveguide 455 can be configured for transmission of a second mode of the two modes. In some examples, the first single-mode waveguide 454 and the second single-mode waveguide 455 can be configured for transmission of two modes of the light having a large difference in group velocities (e.g., by having different waveguide dimensions, by using different materials for forming each of the two waveguides and/or using a photonic crystal waveguide for one of the waveguides, among other potential differences) to enable increased spectrometer frequency resolution for a given waveguide length. For example, as shown in FIG. 4, the first single-mode waveguide 454 can be wider than the second single-mode waveguide 455.

The scattering objects 456 (e.g., weak scattering objects, as described herein) can, in various examples, be spaced at regular intervals (e.g., a spatial frequency) between the first single-mode waveguide 454 and the second single-mode waveguide 455. As such, each of the scattering objects 348 can evanescently couple to scatter a small fraction of light and/or energy present at the particular position of the scattering object and the first single-mode waveguide 454 and the second single-mode waveguide 455. Hence, a fringe pattern can result from the evanescent coupling of the mode transmitted by the first single-mode waveguide 454 and the mode transmitted by the second single-mode waveguide 455. Each of the scattering objects 456 can, in various examples, be configured to scatter a substantially equal amplitude of light, energy, and/or signals from each of the first single-mode waveguide 454 and the second single-mode waveguide 455 for purposes of fringe contrast and/or to substantially equalize loss of the light, energy, and/or signals along a length of each of the first single-mode waveguide 454 and the second single-mode waveguide 455.

Scattering objects, as described herein, can, in various examples, be configured to reduce backscattering of the emitted of light, energy, and/or signals and/or be configured to reduce cross-coupling of between waveguide modes. In some examples, such backscattering and/or cross-coupling can be reduced by using short grating couplers (e.g., with a few periods) as scattering objects and/or forming scattering objects into mirrors (e.g., by 45 degree angled etching, among other techniques).

A magnitude of the light, energy, and/or signals scattered by each of the scattering objects 456 can vary dependent upon a fringe pattern produced by interference of the two modes resulting from the evanescent coupling of the mode transmitted by the first single-mode waveguide 454 and the mode transmitted by the second single-mode waveguide 455. That is, the magnitude of the light, energy, and/or signals scattered by a particular scattering object can depend upon whether the scattering object is associated with (e.g., intersected by) an apex or a nadir, or therebetween, of the fringe pattern (e.g., the spatial beating pattern) produced by interference of the two modes.

For example, the scattering objects associated with an apex of the fringe pattern (e.g., 457-1, 457-2, 457-N) can scatter (e.g., emit) an elevated magnitude of light, energy, and/or signals relative to the scattering objects not associated with the apex of the fringe pattern (e.g., 458-1, 458-N, 459-1, 459-N). A particular magnitude of light, energy, and/or signals scattered by a particular scattering object can, for example, depend on how close to an apex of the fringe pattern the scattering object is and/or a sensitivity of the scattering object, among other considerations. For example, a fringe pattern can be relatively stable (e.g., fixed in space) such that parameters of the fringe pattern can be detected with an arbitrarily long integration time.

As described herein, a high spatial beating frequency (e.g., resulting from a large group and/or phase velocity mismatch) can be aliased to a lower spatial frequency by the scattering objects (e.g., as represented by the light, energy, and/or signals shown at 457-1, 457-2, 457-N, 458-1, 458-N, 459-1, 459-N). The high spatial beating frequency can, for example, be too rapid to effectively resolve by individual detectors (e.g., photoactive sensors) of a measurement device (e.g., a CCD), for example, as shown in FIG. 1. However, the spatial frequency of the light, energy, and/or signals aliased by the scattering objects can be lowered to a range that is resolvable by detectors of a measurement device. Calibration to a particular interference period can, in various examples, be performed by processing resources rather than through adjustment of physical parameters of the two single-mode waveguides with scattering objects positioned therebetween 450 (e.g., adjustment of the spatial frequency of the scattering objects 456).

To enable effective detection and/or resolution of the light, energy, and/or signals scattered (e.g., emitted) by the scattering objects (e.g., scattering objects 456 shown in FIG. 4), the scattering objects can, in various examples, be co-aligned with the detectors of the measurement device. For example, each of the individual detectors 128 (e.g., photoactive sensors) of the measurement device 129 (e.g., a CCD) shown in FIG. 1 is shown as being co-aligned with one of the plurality of scattering objects 124.

Figure 5:
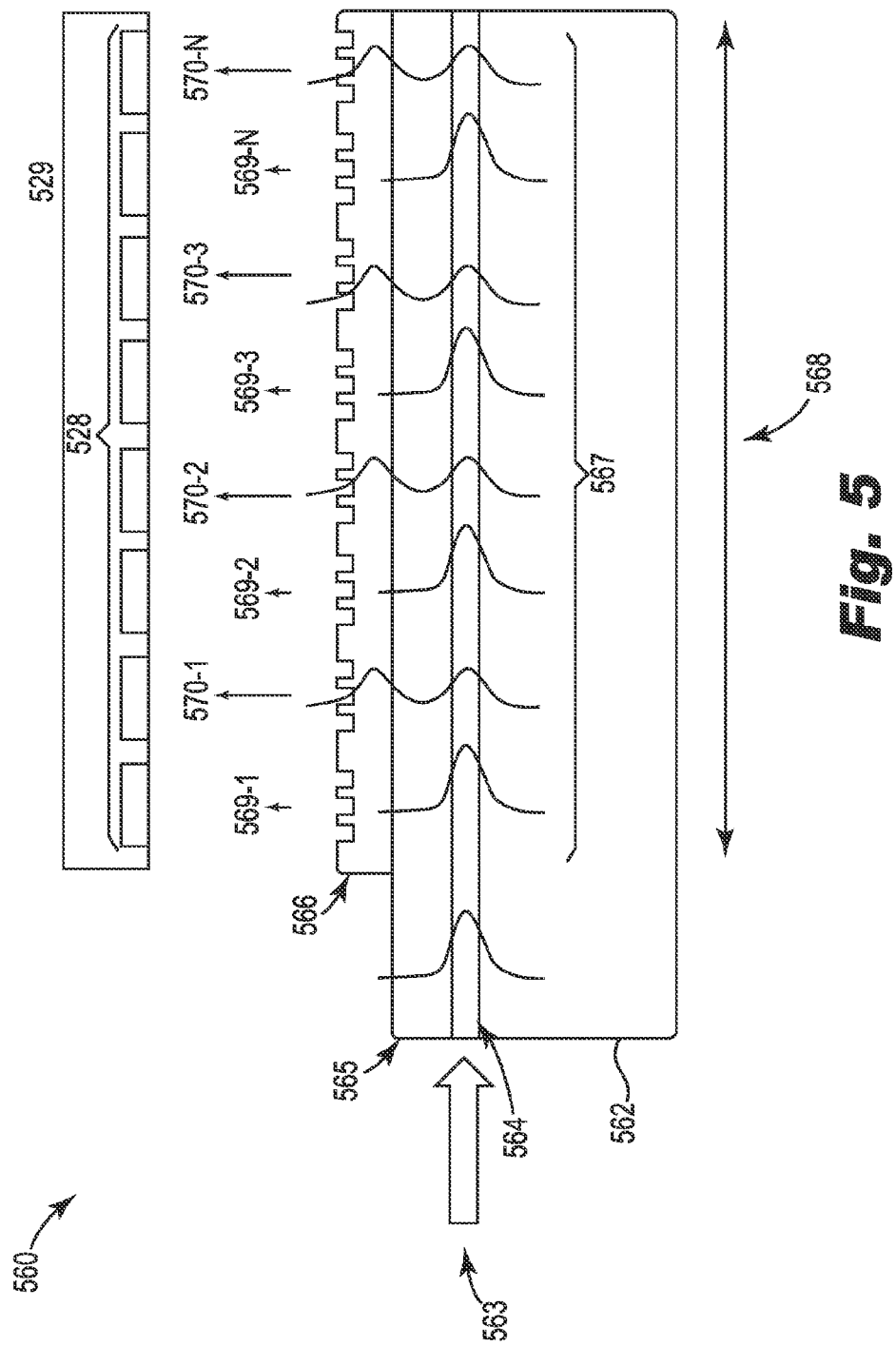
FIG. 5 illustrates an example of resonantly coupling a first single-mode waveguide to a second single-mode waveguide including scattering objects according to the present disclosure.

FIG. 5 illustrates an example of resonantly coupling a first single-mode waveguide to a second single-mode waveguide including scattering objects according to the present disclosure. As illustrated in FIG. 5, the first single-mode waveguide and the second single-mode waveguide including scattering objects 560 are shown from a side view perspective.

A first single-mode waveguide 564 can, in various examples, be formed on a first substrate 562. A second single-mode waveguide 566 including scattering objects 567 can, in various examples, be formed on a lower refractive- and/or reflective-index barrier layer 565 formed between the first single-mode waveguide 564 and the second single-mode waveguide 566. In some examples, the layering of the waveguides, substrate, and/or barrier layers can be performed using silicon-on-insulator (SOI) technology. For example, the single-mode waveguides can be configured to have a large group index mismatch (e.g., with the first single-mode waveguide 564 being formed from silicon nitride and the second single-mode waveguide 566 being formed from amorphous silicon carbide, among others). The first substrate 562 and/or the barrier 565 can, in various examples, be formed from a silicon dielectric (e.g., silicon dioxide).

Input light 563 can be collected (e.g., captured) by the first single-mode waveguide 564. The first single-mode waveguide 564 can, in various examples, be configured for input and/or transmission of light with a single transverse electric and/or a single transverse magnetic mode (e.g., by selected variation of height and/or width dimensions, and/or materials from which the waveguide is formed, among other characteristics). As described herein, oscillation between the first single-mode waveguide 564 and the coupled second single-mode waveguide 566 can result in light, energy, and/or signals (e.g., 569-1, 569-2, 569-3, 569-N, 570-1, 570-2, 570-3, 570-N) being scattered (e.g., emitted) by the scattering objects 567. A magnitude of the scattered light, energy, and/or signals (e.g., 569-1, 569-2, 569-3, 569-N, 570-1, 570-2, 570-3, 570-N) can correspond to a spatially oscillating field intensity of the second single-mode waveguide 566 at a position of a particular scattering object 567.

The scattering objects can, in various examples, be co-aligned with detectors of a measurement device. For example, each of the individual detectors 528 (e.g., photoactive sensors) of the measurement device 529 (e.g., a CCD) is shown as being co-aligned with one of the plurality of scattering objects 567. By way of example, a plurality of scattering objects 567 co-aligned with a plurality of individual detectors 528 shown in FIG. 5 is seven, however, the present disclosure is not limited to seven scattering objects and/or seven co-aligned individual detectors. That is, a plurality of scattering objects co-aligned with a plurality of individual detectors can include any number that is two or more such that the number of scattering objects co-aligned with individual detectors is unlimited (e.g., the number of scattering objects co-aligned with individual detectors can be more than a hundred in some examples).

As illustrated in FIG. 5, the light 563 is input into the first single-mode waveguide 564. The light 563 can progress through first single-mode waveguide 564 for a particular distance until the second single-mode waveguide 566 starts. At that point, the two single-mode waveguides can couple through the barrier layer 565. The distance from the start of the first single-mode waveguide 564 to where the second single-mode waveguide 566 starts can be selected to be long enough that any unguided modes that might be launched due to imperfect coupling of the free-space signal into the waveguide will disperse to a negligible intensity before a beginning of a multimode region 568 (e.g., where lengths of the first single-mode waveguide 564 and the second single-mode waveguide are co-extensive).

Initially the light intensity can be confined in the first single-mode waveguide 564, but because of coupling, some intensity can be transferred to the second single-mode waveguide 566. If the two single-mode waveguides are in perfect resonance, the intensity can transfer predominantly to the second single-mode waveguide 566 after some propagation length, and after another such propagation length, the intensity can transfer predominantly back to the first single-mode waveguide 564. That is, as a function of position along the propagation direction, the optical intensity can oscillate back and forth between the two single-mode waveguides. The stronger the coupling between the single-mode waveguides (e.g., as affected by how thin the barrier layer 565 is), the more rapidly the oscillation can occur.

When the second single-mode waveguide 566 couples with the first single-mode waveguide 564, the combination is analogous to two different modes of a two waveguide system (e.g., as shown in FIG. 4). When the two waveguides are in resonance, the combined modes can be symmetric and anti-symmetric linear combinations of the two modes. Interference between these two combined modes causes light to oscillate back and forth between the two single-mode waveguides. Accordingly, as detailed in the other examples of the present disclosure, resonantly coupling the first single-mode waveguide to the second single-mode waveguide including scattering objects 560, as illustrated in FIG. 5, operates through multimode interference.

Figure 6:
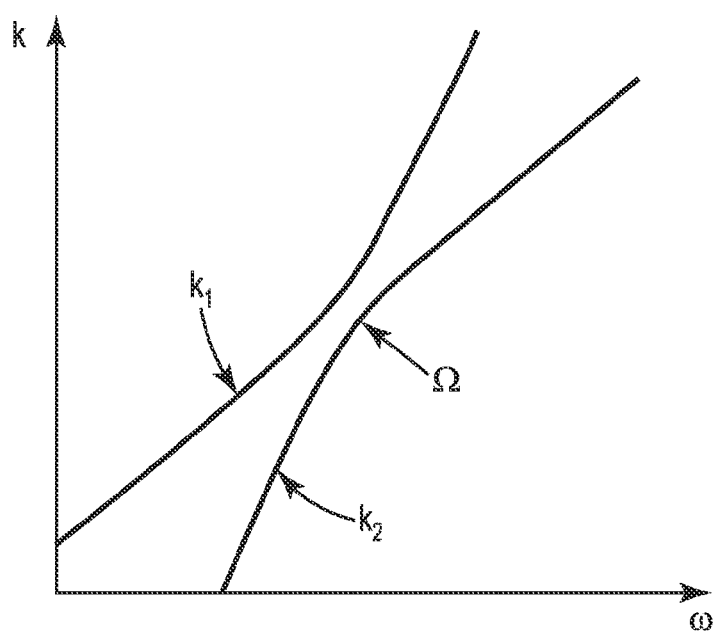
FIG. 6 illustrates an example of a dispersion plot showing an avoided crossing according to the present disclosure.

A coupling rate between the first single-mode waveguide 564 and the second single-mode waveguide 566 can be determined from a dispersion plot, as illustrated in FIG. 6, showing a wavenumber of the first waveguide 564 ($k_1$) and a wavenumber of the second single-mode waveguide 566 ($k_2$) versus a temporal frequency $\omega$. Coupling between the two single-mode waveguides can be indicated by a $k_1$ line having an "avoided crossing", labeled as $\Omega$ in FIG. 6, with a $k_2$ line. The avoided crossings can further represent, for example, avoided crossings of the two different transverse electric and/or transverse magnetic modes on dispersion plots. The coupling rate can be affected by a thickness of the barrier layer 565.

The configuration of the first single-mode waveguide and the second single-mode waveguide including scattering objects 560, as described herein, can be "detuned" from the avoided crossing, where spatial beat frequencies can be indistinguishable for various temporal frequencies, to achieve resolution. The extent of such detuning can be limited so as to allow the coupling between the first single-mode waveguide 564 and the second single-mode waveguide 566. A beat period can vary nonlinearly with the spatial beating frequency and, in various examples, can be calibrated for during post-processing.

When the two single-mode waveguides are slightly out of resonance (e.g., the modes have different wavenumbers for a given temporal frequency of light), some intensity can transfer from the first single-mode waveguide 564 to the second single-mode waveguide 566, but the transfer can be incomplete (e.g., the intensity in the second single-mode waveguide 566 can oscillate between zero and a small value, while the intensity predominantly remains in the first single-mode waveguide 564). The intensity of the oscillations can vary continuously with the detuning of the light's temporal frequency relative to the frequency at which the two waveguides are perfectly coupled (e.g., the temporal frequency at which the wavenumbers are equal for the two waveguides and/or the frequency at which the dispersion curves cross).

Resolution achievable by the first single-mode waveguide and the second single-mode waveguide including scattering objects 560, as described herein, can be approximated by $\Delta v = \sqrt{2} \times (c/L)/(n_{g1} - n_{g2})$, where $\Delta v$ is the resolution, c is the speed of light, L is the co-extensive distance 568 of the first single-mode waveguide 564 and the second single-mode waveguide 566, and $(n_{g1} - n_{g2})$ is a difference between group indices of the first single-mode waveguide 564 and the second single-mode waveguide 566. For example, a resolution of approximately 70 GHz is attainable with a $(n_{g1} - n_{g2})$ value of 0.6 and an L value of 1 centimeter.

Figure 7:
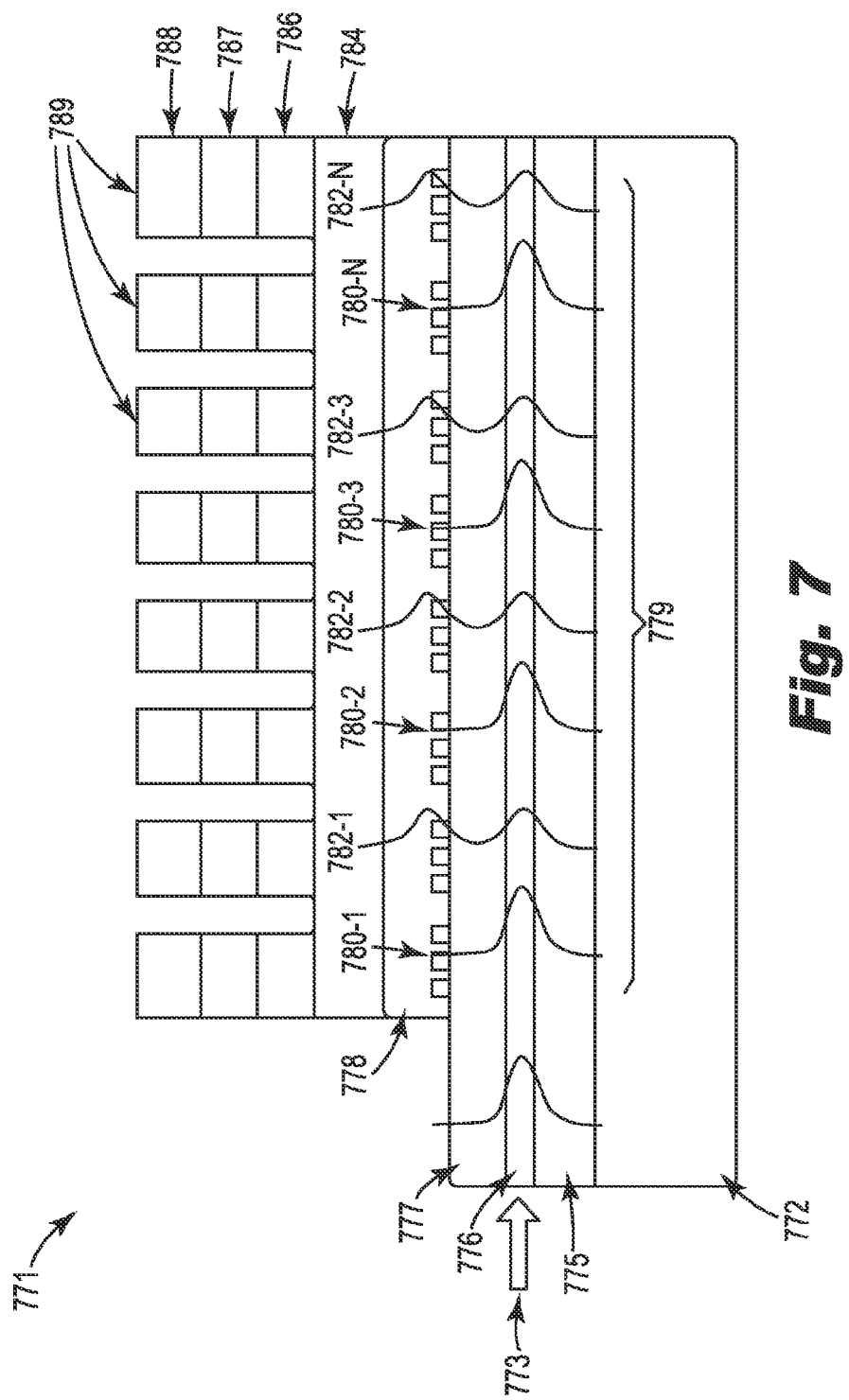
FIG. 7 illustrates another example of resonantly coupling a first single-mode waveguide to a second single-mode waveguide including scattering objects according to the present disclosure.

FIG. 7 illustrates another example of resonantly coupling a first single-mode waveguide to a second single-mode waveguide including scattering objects according to the present disclosure. As illustrated in FIG. 7, the first single-mode waveguide and the second single-mode waveguide including scattering objects 771 are shown from a side view perspective.

A first single-mode waveguide 776 can, in various examples, be formed on a first substrate 772 and an intervening cladding layer 775. In some examples, as described herein, the first single-mode waveguide 776 can be formed from one material or a combination of different materials (e.g., silicon nitride, silicon carbonate, and/or gallium phosphide, among others) and a cladding layer can be formed from a material with a lower refractive- and/or reflective-index (e.g., silicon dioxide, among others). The first single-mode waveguide 776 can, in various examples, have a barrier layer 777 formed on a surface opposite from the substrate 772. The substrate 772 and/or the barrier layer 777 can, in various examples, be formed from a silicon dielectric (e.g., silicon dioxide, among others). In some examples, the layering of the first single-mode waveguide 776, the first substrate 772, and/or the barrier layer 777 can be performed using SOI technology.

A second single-mode waveguide 778 can, in various examples, be formed on a second substrate (not shown). The second single-mode waveguide 778 can have a cladding layer 784 on a surface opposite from the barrier layer 777. The cladding layer 784 can, in various examples, have a first layer 786, a second layer 787, and a third layer 788 formed thereon.

In some examples, the third layer 788, the second layer 787, the first layer 786, the cladding layer 784, and the second single-mode waveguide 778 can be grown epitaxially in that order on the second substrate. As such, the second substrate can be flipped and the second single-mode waveguide 778 can be bonded to the barrier layer 777 (e.g., through wafer bonding techniques, among others).

The second single-mode waveguide 778 can be formed from one material or a combination of different materials (e.g., silicon nitride, silicon carbonate, and/or gallium phosphide, among others). In some examples, the two single-mode waveguides can be configured to have a large group index mismatch (e.g., with the first single-mode waveguide 776 being formed from silicon nitride and the second single-mode waveguide 778 being formed from amorphous silicon carbonate).

The cladding layer 784 can be formed, for example, from a semiconductor oxide material, which also can serve as a support (e.g., undercut) layer for the first layer 786, the second layer 787, and the third layer 788. The first layer 786, the second layer 787, and the third layer 788 can be formed from materials suitable for forming p-i-n detectors (e.g., silicon suitably doped with n and p dopants). Trenches can be formed through the first layer 786, the second layer 787, and the third layer 788 (e.g., via photolithography and/or wet or dry etching techniques, among others) to form p-i-n detectors 789 at regular intervals (e.g., a spatial frequency) on the cladding layer 784.

The second single-mode waveguide 778 can, in various examples, have scattering objects 779 formed at regular intervals (e.g., a spatial frequency) on a surface opposite from the cladding layer 784. In some examples, the scattering objects 779 can be gratings (e.g., formed via photolithography and/or wet or dry etching techniques, among others). The scattering objects 779 can, in some examples, be formed in the second single-mode waveguide 778 before bonding to the barrier layer 777. The trenches can, in various examples, be formed to form the p-i-n detectors 789 after or simultaneously with removal of the second substrate.

By way of example, a plurality of scattering objects 779 co-aligned with a plurality of individual p-i-n detectors 789 shown in FIG. 7 is eight, however, the present disclosure is not limited to eight scattering objects and/or eight co-aligned individual p-i-n detectors. That is, a plurality of scattering objects co-aligned with a plurality of individual p-i-n detectors can include any number that is two or more such that the number of scattering objects co-aligned with individual p-i-n detectors is unlimited (e.g., the number of scattering objects co-aligned with individual p-i-n detectors can be more than a hundred in some examples).

The spatial frequency of the scattering objects 779 can substantially match the spatial frequency of the p-i-n detectors 789. For example, scattering objects 779 can be configured as gratings with a predetermined pitch, etch angle, and/or duty cycle for diffraction and/or reflection of energy, light and/or signals in an intended direction. As such, the energy, light and/or signals emitted from each grating can be directed toward a particular p-i-n detector 789. The first single-mode waveguide and the second single-mode waveguide including scattering objects 771 shown in FIG. 7 is thereby integrated with p-i-n detectors 789.

Input light 773 can be collected (e.g., captured) by the first single-mode waveguide 776. The first single-mode waveguide 776 can, in various examples, be configured for input and/or transmission of light with, for example, a single transverse electric and/or a single transverse magnetic mode (e.g., by selected variation of height and/or width dimensions, and/or materials from which the waveguide is formed, among other characteristics). As described herein, oscillation between the first single-mode waveguide 776 and the coupled second single-mode waveguide 778 can result in light, energy, and/or signals (e.g., 780-1, 780-2, 780-3, 780-N, 782-1, 782-2, 782-3, 782-N) being scattered (e.g., emitted) by the scattering objects 779. As described with regard to FIG. 5, a magnitude of the scattered light, energy, and/or signals (e.g., 780-1, 780-2, 780-3, 780-N, 782-1, 782-2, 782-3, 782-N) can correspond to a spatial oscillating field intensity of the second single-mode waveguide 778 at a position of a particular scattering object 779.

In addition, a magnitude of signals output by the p-i-n detectors 789 can correspond to the magnitude of the scattered light, energy, and/or signals (e.g., 780-1, 780-2, 780-3, 780-N, 782-1, 782-2, 782-3, 782-N) emitted by the gratings. P-i-n detector 789 signals can, in some examples, be output (e.g., via circuitry) for analysis by processing resources.

Hence, as described herein, an apparatus for analyzing light by mode interference can include a number of waveguides (e.g., 114, 232, 344, 454, 455, 564, 774) to support (e.g., via selected physical characteristics of an input coupler 116, 234, an input waveguide 342, and/or a waveguide 114, 232, 344, 454, 455, 564, 774) two modes of the light (e.g., 103, 109, 343, 453, 563, 773) that have a particular polarization. The apparatus can include a plurality of scattering objects (e.g., 124, 232, 346, 456, 567, 779) offset from and substantially parallel to a center axis of each of the number of waveguides, where the plurality of scattering objects can emit signals (e.g., 126, 347, 457, 458, 459, 569, 570, 780, 782) collected from interference between the two modes of the light that are aliased to a lower frequency.

In some examples, as described herein, the apparatus can include non-transitory computer readable instructions executed by a processor to determine a spectrum of the light (e.g., 103, 343, 453, 563, 773) with Fourier analysis by analysis of an interference pattern determined from the signals (e.g., 126, 347, 457, 458, 459, 569, 570, 780, 782) emitted by the plurality of scattering objects (e.g., 124, 232, 346, 456, 567, 779). In various examples, the apparatuses and systems for analyzing light by mode interference described herein can be incorporated into spectroscopic analysis performed by a spectroscopic device and/or system.

Being offset from the center axis of each of the number of waveguides can, in various examples, indicate scattering objects being horizontally offset (e.g., as shown in FIGS. 3A and 4) and/or scattering objects being vertically offset (e.g., as shown in FIGS. 1, 2, 3B, 5, and 7). Moreover, being offset from and substantially parallel to a center axis can, in various examples, indicate scattering objects being physically connected to a particular waveguide (e.g., as shown in FIGS. 1, 2, 3A-3B, FIG. 5 at 566, and FIG. 7 at 778), scattering objects not being physically connected to a particular waveguide but being within evanescent coupling distance of one or more waveguides (e.g., as shown in FIG. 4), and/or scattering objects being physically connected to a particular waveguide (e.g., as shown in FIG. 5 at 566 and FIG. 7 at 778) within resonant coupling distance of another waveguide (e.g., as shown in FIG. 5 at 564 and FIG. 7 at 776).

Some examples can include two modes of two waveguides horizontally displaced (e.g., as shown in FIG. 4 at 454, 455)

that are evanescently coupled to a plurality of scattering objects positioned therebetween (e.g., as shown in FIG. 4 at 456). Some examples can include two waveguides vertically displaced (e.g., as shown in FIG. 5 at 564, 566 and FIG. 7 at 776, 778) that are resonantly coupled and the plurality of scattering objects (e.g., as shown in FIG. 5 at 567 and FIG. 7 at 779) offset substantially vertically from a center of one waveguide (e.g., as shown in FIG. 5 at 566 and FIG. 7 at 778). Such examples can include the signals (e.g., as shown in FIG. 5 at 569, 570 and FIG. 7 at 780, 782) emitted by the plurality of scattering objects (e.g., as shown in FIG. 5 at 567 and FIG. 7 at 779) being directed substantially away from the other waveguide (e.g., as shown in FIG. 5 at 564 and FIG. 7 at 774). Some examples can include the signals (e.g., as shown in FIG. 7 at 780, 782) emitted by each of the plurality of scattering objects (e.g., as shown in FIG. 7 at 779) being directed toward individual p-i-n detectors (e.g., as shown in FIG. 7 at 789).

Figure 8:
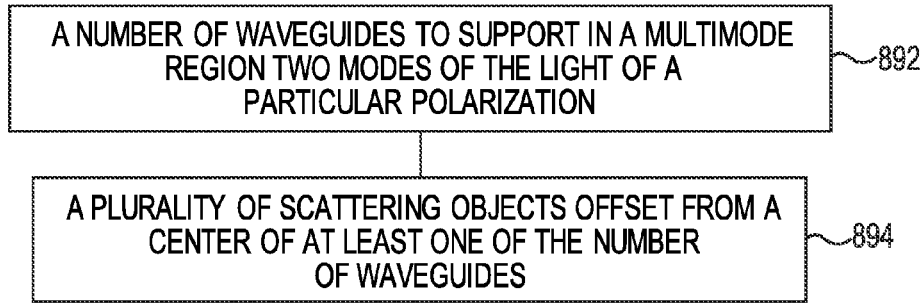
FIG. 8 is block diagram illustrating an example of an apparatus for analyzing light by mode interference formed according to the present disclosure.

FIG. 8 is block diagram illustrating another example of an apparatus for analyzing light by mode interference according to the present disclosure. The apparatus can include a number of waveguides to support in a multimode region two modes of the light of a particular polarization, as shown in block 892. The apparatus can further include, as shown in block 894, a plurality of scattering objects offset from a center of at least one of the number of waveguides.

In various examples, the apparatus can include a single-mode input waveguide (e.g., 234 in FIG. 2, 342 in FIGS. 3A-3B, 452 in FIG. 4, 564 in FIG. 5, and 776 in FIG. 7) to collect a single mode of the light emitted from a single source and input the single mode of light into the number of waveguides (e.g., 235 in FIG. 2, 344 in FIGS. 3A-3B, 454, 455 in FIG. 4, 564, 566 in FIG. 5, and 776, 778 in FIG. 7) that separate the single mode in the multimode region (e.g., 568 in FIG. 5) into the two modes of the light. As described herein, the two modes can be supported in a deterministic manner by the light being collected from the single source by the single-mode input waveguide. As described herein, the multimode region is a region in which the two modes of the light of the particular polarization can interfere to produce a spatial beating pattern that varies relative to a particular position in one waveguide or two waveguides.

In some examples, the number of waveguides can include one multimode waveguide to support the two modes of the light in the multimode region (e.g., 235 in FIGS. 2 and 344 in FIGS. 3A-3B). In some examples, the number of waveguides can include two single-mode waveguides to support the two modes of the light in the multimode region (e.g., 454, 455 in FIG. 4, 564, 566 in FIG. 5, and 776, 778 in FIG. 7). Some examples can include the single-mode input waveguide inputting the light into one of the two single-mode waveguides (e.g., 564 in FIGS. 5 and 776 in FIG. 7). Some examples can include the single-mode input waveguide inputting the light into both of the two single-mode waveguides (e.g., 454, 455 in FIG. 4).

In some examples, as described herein, an interference pattern obtained through direct collection of the signals emitted by the plurality of scattering objects can be transformed into a frequency spectrum with Fourier analysis. For example, the aliased energy, light, and/or signals can, as described herein, be analyzed and/or calibrated by processing resources using Fourier analysis to determine particular characteristics (e.g., the spectrum) that identify a particular source for the input light (e.g., via Raman spectroscopy). In various examples, the apparatus can include a charge coupled device with sensors co-aligned with the plurality of scattering objects to collect the energy, light, and/or signals emitted by the plurality of scattering objects.

The apparatuses and systems for analyzing light by mode interference described herein can be implemented as a chip-based device (e.g., using semiconductor micro-technology) that uses two-dimensional layouts of input couplers, waveguides, scattering objects, and/or measurement devices, among others (e.g., for an on-chip spectrometer, among other applications). For example, such a chip-based device can function as a sophisticated optical filter that can be coupled to a measurement device, such as a CCD chip. Such a combination can take a large number of parallel inputs and generate a spectrographic pattern from which a spectrum can be computed for each input, while making efficient use of the space on a chip. The light inputs can be arranged in a linear configuration orthogonal to the incoming direction of the input light (e.g., as an alternative to an entrance slit of a conventional spectrometer). In some examples, an on-chip grating (e.g., an echelle grating) can be utilized as a coarse frequency sorting element to create separate bands of different frequencies for input into the separate waveguides. For instance, the on-chip grating can occupy less area and/or space than the AWG. Alternatively, an off-chip component (e.g., a prism, among others) can be used in combination with an imaging lens (e.g., 107 in FIG. 1) for coarse frequency sorting.

Examples of the present disclosure can include apparatuses and systems for analyzing light by mode interference, including executable instructions and/or logic to facilitate fabricating and/or operating the apparatuses and/or systems. Processing resources can include one or more processors able to access data stored in memory to execute the formations, actions, functions, etc., as described herein. As used herein, "logic" is an alternative or additional processing resource to execute the formations, actions, functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

It is to be understood that the descriptions presented herein have been made in an illustrative manner and not a restrictive manner. Although specific examples for apparatuses, systems, methods, computing devices, and instructions have been illustrated and described herein, other equivalent component arrangements, instructions, and/or device logic can be substituted for the specific examples presented herein without departing from the spirit and scope of the present disclosure.

What is claimed:

1. An apparatus for analyzing light by mode interference, comprising:
    a number of waveguides to support in a multimode region two modes of the light of a particular polarization; and
    a plurality of scattering objects offset from a center of at least one of the number of waveguides,
        wherein the plurality of scattering objects is positioned at a spatial frequency associated with apices of a selected one of:
            an intensity of a first mode,
            an intensity of a second mode, and
            an intensity of an interference pattern of the first and second modes, and
        wherein at least one non-associated apex is between two associated apices such that the apices associated with the plurality of scattering objects are aliased to a lower spatial frequency.

2. The apparatus of claim 1, comprising a single-mode input waveguide to collect a single mode of the light emitted from a single source and input the single mode of light into the number of waveguides that separate the single mode in the multimode region into the two modes of the light.

3. The apparatus of claim 1, wherein the number of waveguides comprises one multimode waveguide to support the two modes of the light in the multimode region.

4. The apparatus of claim 1, wherein the number of waveguides comprises two single-mode waveguides to support the two modes of the light in the multimode region.

5. The apparatus of claim 4, wherein a single-mode input waveguide inputs the light into one of the two single-mode waveguides.

6. The apparatus of claim 4, wherein a single-mode input waveguide inputs the light into both of the two single-mode waveguides.

7. The apparatus of claim 1, comprising a charge coupled device with a spatial frequency of sensors co-aligned with the plurality of scattering objects positioned as such to collect signals emitted by the plurality of scattering objects.

8. An apparatus for analyzing light by mode interference, comprising:
   a number of waveguides to support two modes of the light that have a particular polarization; and
   a plurality of scattering objects offset from and substantially parallel to a center axis of each of the number of waveguides,
   wherein the plurality of scattering objects is positioned at a spatial frequency associated with apices of a selected one of:
      an intensity of a first mode,
      an intensity of a second mode, and
      an intensity of an interference pattern of the first and second modes,
   wherein at least one non-associated apex is between two associated apices such that the apices associated with the plurality of scattering objects are aliased to a lower spatial frequency, and
   wherein there is at least one scattering object between scattering objects associated with the two apices.

9. The apparatus of claim 8, comprising non-transitory computer readable instructions executed by a processor to determine a spectrum of the light with Fourier analysis by analysis of the interference pattern determined from the signals emitted by the plurality of scattering objects.

10. The apparatus of claim 8, comprising two modes of two waveguides horizontally displaced that are evanescently coupled to a plurality of scattering objects positioned therebetween.

11. The apparatus of claim 8, comprising two waveguides vertically displaced that are resonantly coupled and the plurality of scattering objects offset substantially vertically from a center of one waveguide, further comprising the signals emitted by the plurality of scattering objects directed substantially away from the other waveguide.

12. The apparatus of claim 11, comprising the signals emitted by each of the plurality of scattering objects directed toward individual p-i-n detectors.

13. A system for analyzing light by mode interference, comprising:
   a plurality of scattering objects offset from and substantially parallel to a center axis of each of a number of waveguides; and
   wherein the number of waveguides is formed to support two modes of the light,
   wherein the plurality of scattering objects is positioned at a spatial frequency associated with apices of a selected one of:
      an intensity of a first mode,
      an intensity of a second mode, and
      an intensity of an interference pattern of the first and second modes, and
   wherein at least one non-associated apex is between two associated apices such that the apices associated with the plurality of scattering objects are aliased to a lower spatial frequency; and
   a charge coupled device with a spatial frequency of sensors co-aligned with the plurality of scattering objects positioned as such to directly collect signals emitted by the plurality of scattering objects.

14. The system of claim 13, comprising a plurality of substantially parallel waveguides that form a two dimensional array.

15. The system of claim 13, comprising a coarse frequency sorting element for separation of input light into a plurality of different output ranges of optical frequencies.

* * * * *